US009428170B2

(12) United States Patent
Tamaru (10) Patent No.: US 9,428,170 B2
(45) Date of Patent: *Aug. 30, 2016

(54) VEHICLE DRIVING DEVICE

(71) Applicant: AISIN SEIKI KABUSHIKI KAISHA, Kariya-shi (JP)

(72) Inventor: Daisuke Tamaru, Tokai (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 173 days.

This patent is subject to a terminal disclaimer.

(21) Appl. No.: 14/285,358

(22) Filed: May 22, 2014

(65) Prior Publication Data

US 2014/0350811 A1  Nov. 27, 2014

(30) Foreign Application Priority Data

May 27, 2013  (JP) ................................. 2013-111122

(51) Int. Cl.

| B60W 10/02 | (2006.01) |
|---|---|
| B60W 10/06 | (2006.01) |
| B60T 7/22 | (2006.01) |
| B60W 10/184 | (2012.01) |
| B60W 30/09 | (2012.01) |
| F16D 48/06 | (2006.01) |
| B60W 30/18 | (2012.01) |
| F02D 41/12 | (2006.01) |
| F02M 69/28 | (2006.01) |

(52) U.S. Cl.

CPC ................. *B60W 10/06* (2013.01); *B60T 7/22* (2013.01); *B60W 10/02* (2013.01); *B60W 10/184* (2013.01); *B60W 30/09* (2013.01); *B60W 30/18136* (2013.01); *F16D 48/06* (2013.01); *B60T 2201/022* (2013.01); *B60W 2510/0208* (2013.01); *B60W 2510/101* (2013.01); *B60W 2520/10* (2013.01); *B60W 2550/10* (2013.01); *B60W 2710/027* (2013.01); *B60W 2710/0627* (2013.01); *B60W 2710/0666* (2013.01); *F02D 41/123* (2013.01); *F02M 69/28* (2013.01); *F02M 2200/185* (2013.01);

(Continued)

(58) Field of Classification Search
None
See application file for complete search history.

(56) References Cited

U.S. PATENT DOCUMENTS

| 5,864,285 A * | 1/1999 | Wieder .............. B60K 31/0008 340/435 |
|---|---|---|
| 5,889,476 A | 3/1999 | Schmitz |

(Continued)

FOREIGN PATENT DOCUMENTS

| DE | 102004031305 A1 | 1/2006 |
|---|---|---|
| DE | 102010003677 A1 | 10/2011 |

(Continued)

OTHER PUBLICATIONS

Extended Search Report issued on Nov. 24, 2014, by the European Patent Office in corresponding European Patent Application No. 14168780.6-1752 (8 pages).

*Primary Examiner* — Edwin A Young
(74) *Attorney, Agent, or Firm* — Buchanan Ingersoll & Rooney PC (57) ABSTRACT

A vehicle driving device includes: a clutch that is provided between a driving shaft of an engine and an input shaft of a manual transmission and that connects the driving shaft and the input shaft to each other or disconnects the driving shaft and the input shaft from each other; a detection unit that detects an obstacle that is an obstacle to traveling of a host vehicle; a collision possibility determination unit that determines a possibility of collision between the obstacle and the host vehicle based on obstacle detection information detected by the detection unit; and a collision avoidance unit that, when the collision possibility determination unit determines that there is a possibility of collision with the obstacle, performs a fuel cut of the engine even if a rotation speed of the engine is less than an idling rotation speed.

6 Claims, 6 Drawing Sheets

(52) U.S. Cl.
CPC ............... *F16D 2500/1082* (2013.01); *F16D 2500/3128* (2013.01); *F16D 2500/50287* (2013.01); *F16D 2500/51* (2013.01); *F16D 2500/7041* (2013.01); *F16D 2500/7044* (2013.01); *F16D 2500/7105* (2013.01)

(56) References Cited

U.S. PATENT DOCUMENTS

2010/0198491 A1\* 8/2010 Mays .................. B60W 30/09
701/124

2013/0218433 A1   8/2013  Matsuno
2014/0095038 A1   4/2014  Breu et al.
2014/0350809 A1\* 11/2014  Tamaru ..................... B60T 7/22
701/67

FOREIGN PATENT DOCUMENTS

| | | |
|---|---|---|
| DE | 102011102330 A1 | 11/2012 |
| FR | 2796601 A1 | 1/2001 |
| JP | 11-321389 A | 11/1999 |
| WO | 2006000481 A1 | 1/2006 |

\* cited by examiner

VEHICLE DRIVING DEVICE

CROSS REFERENCE TO RELATED APPLICATIONS

This application is based on and claims priority under 35 U.S.C. §119 to Japanese Patent Application 2013-111122, filed on May 27, 2013, the entire contents of which are incorporated herein by reference.

TECHNICAL FIELD

This disclosure relates to a vehicle driving device for manual transmission having an anti-collision function.

BACKGROUND DISCUSSION

In recent years, to avoid collision with a vehicle in front, an automatic brake control device for a vehicle is known which detects a distance between a host vehicle and an obstacle in front from an image captured by a camera or a sensor, such as a laser radar, and makes a brake device operate automatically with a predetermined target deceleration to prevent collision with the obstacle in front when the distance becomes shorter than a predetermined distance.

In the control device for achieving such anti-collision, it is possible to perform the collision avoidance more effectively if control using the engine brake is performed by using the engine brake efficiently.

For example, JP 11-321389A (Reference 1) discloses a device to realize a collision safety function using an automatic brake device in a vehicle in which an automatic transmission is mounted. Specifically, JP 11-321389A (Reference 1) discloses an anti-collision technique for reducing the relative acceleration with respect to an obstacle in front, with which a host vehicle may collide, by shifting an automatic transmission so that the driving force transmitted to the driving wheels is reduced, compared with a case where there is no collision avoidance control, when a distance between the host vehicle and the obstacle in front is smaller than the safety distance when the host vehicle is accelerating.

The technique disclosed in JP 11-321389A (Reference 1) is applied to the automatic transmission in which gear shift determination is performed by a control device. In a vehicle including a manual transmission to switch the gear by the driver, however, even if the anti-collision control function using the automatic transmission described above is realized, collision avoidance cannot be automatically performed with good efficiency since the driver has to select a gear. For this reason, it is not possible to apply the anti-collision technique disclosed in JP 11-321389A (Reference 1).

SUMMARY

Thus, a need exists for a vehicle driving device which is not suspectable to the drawback mentioned above.

A first aspect of this disclosure is directed to a vehicle driving device including: a clutch that is provided between a driving shaft of an engine and an input shaft of a manual transmission and that connects the driving shaft and the input shaft to each other or disconnects the driving shaft and the input shaft from each other; a detection unit that detects an obstacle that is an obstacle to traveling of a host vehicle; a collision possibility determination unit that determines a possibility of collision between the obstacle and the host vehicle based on obstacle detection information detected by the detection unit; and a collision avoidance unit that, when the collision possibility determination unit determines that there is a possibility of collision with the obstacle, performs a fuel cut of the engine even if a rotation speed of the engine is less than an idling rotation speed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION (Description of a Vehicle)

Figure 1:
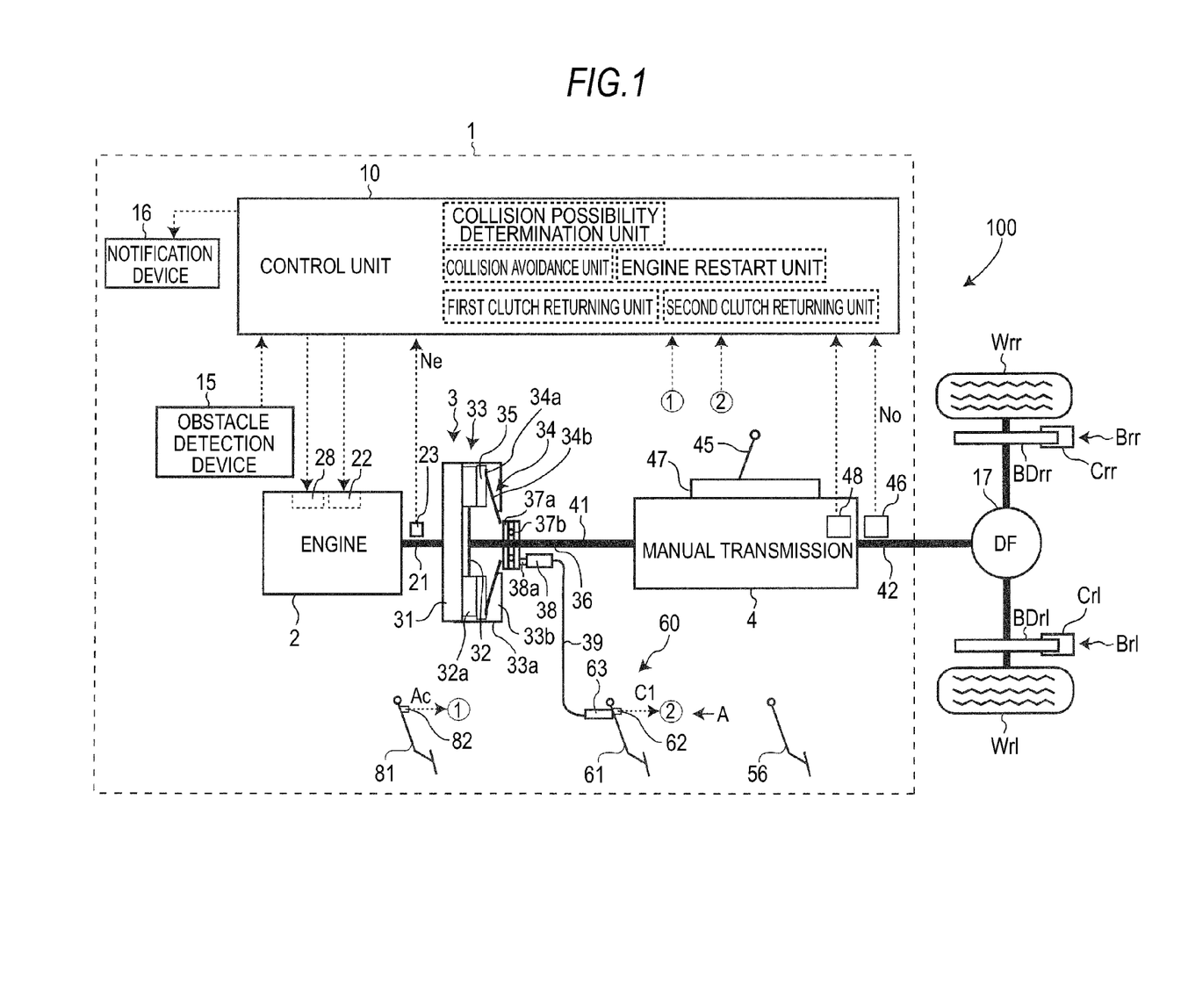
FIG. 1 is a block diagram showing the configuration of a vehicle driving device of the present embodiment.

A vehicle driving device 1 will be described with reference to FIG. 1. FIG. 1 schematically shows the vehicle driving device 1 of a vehicle 100 including an engine 2. In FIG. 1, a thick line shows a mechanical connection between devices, and the arrow by the dotted line shows a signal line for control.

As shown in FIG. 1, in the vehicle 100, the engine 2, a clutch 3, a manual transmission 4, and a differential device 17 are disposed in series in this order. Driving wheels Wrr and Wrl of the vehicle 100 are connected to the differential device 17.

The vehicle 100 includes an accelerator pedal 81 and a clutch pedal 61. The accelerator pedal 81 (engine operation unit) is for variably operating engine torque Te output from the engine 2. An accelerator sensor 82 (engine operation amount detection unit) that detects an accelerator opening Ac, which is the operation amount of the accelerator pedal 81, is provided in the accelerator pedal 81.

The clutch pedal 61 (clutch operation unit) is for operating the clutch 3 by changing clutch torque Tc to be described later. The vehicle 100 includes a master cylinder 63 that generates a hydraulic pressure corresponding to the operation amount of the clutch pedal 61. A clutch sensor 62 (clutch operation detection unit) that detects the stroke of the master cylinder 63, that is, the operation amount (hereinafter, appropriately referred to as a clutch stroke Cl) of the clutch pedal 61 is provided in the master cylinder 63.

The engine 2 is a gasoline engine, a diesel engine, or the like that uses a hydrocarbon fuel, such as gasoline or diesel. The engine 2 includes a driving shaft 21, a throttle valve 22, an engine rotation speed sensor 23, and a fuel injection device 28. The driving shaft 21 rotates integrally with a crankshaft that is driven to rotate by a piston. Thus, the engine 2 outputs the engine torque Te to the driving shaft 21 to drive the driving wheels Wrr and Wrl. When the engine 2 is a gasoline engine, an ignition device (not shown) for igniting the air-fuel mixture in the cylinder is provided in the cylinder head of the engine 2.

The throttle valve 22 is provided in the middle of the path to take air into the cylinder of the engine 2. The throttle valve 22 is for adjusting the amount of air (amount of air-fuel mixture) taken into the cylinder of the engine 2. The fuel injection device 28 is provided in the middle of the path to take air into the inside of the engine 2 or in the cylinder head of the engine 2. The fuel injection device 28 is a device for injecting fuel, such as gasoline or diesel.

The engine rotation speed sensor 23 is disposed at a position adjacent to the driving shaft 21. The engine rotation speed sensor 23 detects an engine rotation speed Ne, which is the rotation speed of the driving shaft 21, and outputs the detection signal to a control unit 10 as a collision possibility determination unit or a collision avoidance unit. In the present embodiment, the driving shaft 21 of the engine 2 is connected to a flywheel 31 that is an input member of the clutch 3 to be described later.

The clutch 3 is provided between the driving shaft 21 of the engine 2 and an input shaft 41 of the manual transmission 4 to be described later. The clutch 3 is a manual type clutch that connects the driving shaft 21 and the input shaft 41 to each other or disconnects the driving shaft 21 and the input shaft 41 from each other by the operation of the clutch pedal 61 by the driver and changes the clutch torque Tc (shown in FIG. 2) between the driving shaft 21 and the input shaft 41. The clutch 3 includes the flywheel 31, a clutch disc 32, a clutch cover 33, a diaphragm spring 34, a pressure plate 35, a clutch shaft 36, a release bearing 37, and a slave cylinder 38.

The flywheel 31 has a disk shape, and is connected to the driving shaft 21. The clutch shaft 36 is connected to the input shaft 41. The clutch disc 32 has a disk shape, and a friction material 32a is provided on both surfaces of the outer peripheral portion. The clutch disc 32 spline-fits to the tip of the clutch shaft 36 so as to face the flywheel 31 and so as to be axially movable and be not rotatable.

The clutch cover 33 is configured to include a cylindrical portion 33a having a flat cylindrical shape and a plate portion 33b extending in a rotation center direction from one end of the cylindrical portion 33a. The other end of the cylindrical portion 33a is connected to the flywheel 31. Accordingly, the clutch cover 33 rotates integrally with the flywheel 31. The pressure plate 35 has a disk shape with a hole opened at the center. The pressure plate 35 is axially movably disposed so as to face the clutch disc 32 on the opposite side of the flywheel 31. The clutch shaft 36 is inserted into the center of the pressure plate 35.

The diaphragm spring 34 is configured to include a ring portion 34a having a ring shape and a plurality of plate spring portions 34b extending inwardly from the inner periphery of the ring portion 34a. The plate spring portion 34b is inclined gradually toward the inside direction so as to be located on the plate portion 33b side. The plate spring portion 34b is elastically deformable in the axial direction. The diaphragm spring 34 is disposed between the pressure plate 35 and the plate portion 33b of the clutch cover 33 in a state where the plate spring portion 34b is compressed in the axial direction. The ring portion 34a is in contact with the pressure plate 35. An intermediate portion of the plate spring portion 34b is connected to the inner periphery of the plate portion 33b. The clutch shaft 36 is inserted into the center of the diaphragm spring 34.

The release bearing 37 is fixed to a housing (not shown) of the clutch 3. The clutch shaft 36 is inserted into the center of the release bearing 37, and is disposed so as to be axially movable. The release bearing is configured to include first and second members 37a and 37b that face each other and can rotate relative to each other. The first member 37a is in contact with the tip of the plate portion 33b.

The slave cylinder 38 includes a push rod 38a that moves back and forth by hydraulic pressure. The tip of the push rod 38a is in contact with the second member 37b of the release bearing 37. The slave cylinder 38 and the master cylinder 63 are connected to each other by a hydraulic pressure pipe 39.

In a state where the clutch pedal 61 is not stepped on, hydraulic pressure is generated in neither the master cylinder 63 nor the slave cylinder 38. In this state, the clutch disc 32 is pressed by being biased to the flywheel 31 by the diaphragm spring 34 through the pressure plate 35. Therefore, due to the frictional force between the friction material 32a and the flywheel 31 and the frictional force between the friction material 32a and the pressure plate 35, the flywheel 31, the clutch disc 32, and the pressure plate 35 rotate integrally, and the driving shaft 21 and the input shaft 41 rotate integrally.

On the other hand, when the clutch pedal 61 is stepped on, hydraulic pressure occurs in the master cylinder 63, and hydraulic pressure also occurs in the slave cylinder 38. Then, the push rod 38a of the slave cylinder 38 presses the release bearing 37 against the diaphragm spring 34 side. Then, the plate spring portion 34b is deformed with its connection portion, which is connected to the inner periphery of the plate portion 33b, as a support point, and the biasing force to bias the clutch disc 32 to the flywheel 31 is reduced and finally becomes 0.

Figure 2:
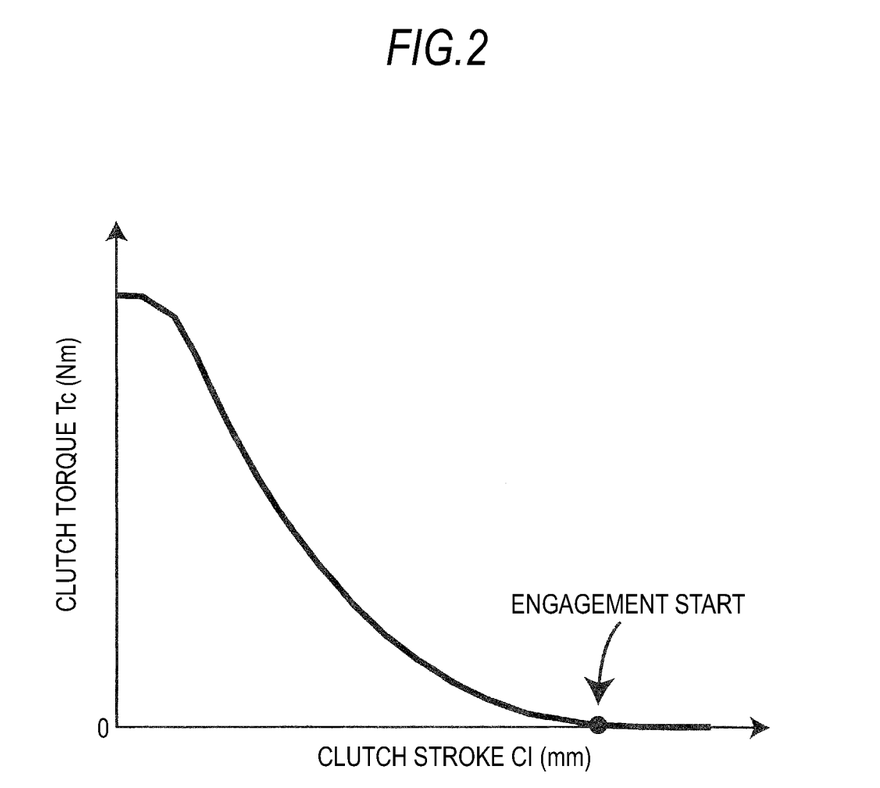
FIG. 2 is "clutch torque mapping data" showing the relationship between the clutch stroke and the clutch torque.

As shown in FIG. 2, as the clutch stroke Cl that is a stroke of the master cylinder 63 increases, the clutch torque Tc that the clutch 3 transmits from the driving shaft 21 to the input shaft 41 is reduced. When the biasing force becomes 0, the clutch torque Tc becomes 0, and the clutch 3 is completely disengaged. Thus, the clutch 3 of the present embodiment is a normally closed clutch that is in a connection state when the clutch pedal 61 is not stepped on.

The manual transmission 4 is provided between the driving shaft 21 and the driving wheels Wrr and Wrl. The manual transmission 4 includes the input shaft 41 and an output shaft 42. The input shaft 41 is connected to the clutch shaft 36 that is an output member of the clutch 3, and the engine torque Te from the engine 2 is input to the input shaft 41. The output shaft 42 is rotatably connected to the driving wheels Wrr and Wrl. The manual transmission 4 is a multi-stage transmission for selectively switching a plurality of gears of different gear ratios, which are obtained by dividing an input shaft rotation speed Ni (rotation speed of the input shaft 41) by an output shaft rotation speed No, between the input shaft 41 and the output shaft 42.

The manual transmission 4 includes a shift operation mechanism 47 that converts the operation of a shift lever 45 by the driver into the force to operate a selection mechanism. The driver can select the above-described gear by operating the shift lever 45, and can make the manual transmission 4 in a neutral state where the input shaft 41 and the output shaft 42 are not rotatably connected to each other. The manual transmission 4 includes a neutral detection sensor 48 that detects whether or not the current state is a neutral state and outputs a detection signal to the control unit 10.

An output shaft rotation speed sensor 46 that detects the rotation speed (output shaft rotation speed No) of the output shaft 42 is provided at a position adjacent to the output shaft 42. The output shaft rotation speed No detected by the output shaft rotation speed sensor 46 is output to the control unit 10.

The control unit 10 performs overall control of the vehicle 100. The control unit 10 includes a CPU, a RAM, a ROM, a storage unit formed of a nonvolatile memory, and the like (all of which are not shown). The CPU executes a program corresponding to the flowchart shown in FIG. 5. The RAM temporarily stores variables required to execute the program. The storage unit stores the program or mapping data shown in FIG. 2.

The control unit 10 calculates required engine torque Ter, which is the torque of the engine 2 that the driver requests, based on the accelerator opening Ac of the accelerator sensor 82 that is based on the operation of the accelerator pedal 81 by the driver. Then, based on the required engine torque Ter, the control unit 10 adjusts an opening S of the throttle valve 22 to adjust the amount of intake air, and adjusts the fuel injection amount of the fuel injection device 28 to control the ignition device. As a result, since the amount of supply of the air-fuel mixture containing fuel is adjusted, the engine torque Te output from the engine 2 is adjusted to the required engine torque Ter, and the engine rotation speed Ne is adjusted.

When the engine rotation speed Ne is less than the idling rotation speed (for example, 800 r.p.m.), the control unit 10 controls the throttle valve 22, the fuel injection device 28, and the ignition device to maintain the engine rotation speed Ne at the idling rotation speed, regardless of the operation of the accelerator pedal 81 by the driver. However, as will be described later, when there is a possibility of collision of the vehicle 100 based on detection information from an obstacle detection device 15, the stopping of a fuel cut is stopped, that is, the fuel cut is maintained even if the engine rotation speed Ne is less than the idling rotation speed, thereby maintaining the occurrence of engine brake.

The vehicle 100 includes the obstacle detection device 15. The obstacle detection device 15 is a device that detects an obstacle in front of the vehicle 100. For example, the obstacle detection device 15 is a stereo camera, a millimeter-wave radar, or an infrared laser radar. The obstacle detection device 15 is mounted in front of the driver's seat of the vehicle 100 or on a bumper of the vehicle 100 so as to face forward.

The control unit 10 determines whether or not there is a possibility that the vehicle 100 will collide with an obstacle in front based on the obstacle detection information from the output shaft rotation speed sensor 46 and the obstacle detection device 15. Specifically, first, the control unit 10 calculates the speed of the vehicle 100 (hereinafter, abbreviated to host vehicle speed Vown) based on the obstacle detection signal from the output shaft rotation speed sensor 46. Then, the control unit 10 calculates a relative distance to the obstacle based on the obstacle detection information from the obstacle detection device 15.

Then, the control unit 10 determines whether or not there is a possibility that the vehicle 100 will collide with the obstacle based on the relative distance to the obstacle and the host vehicle speed Vown. The technique for determining whether or not there is a possibility that the vehicle 100 will collide with an obstacle is a known technique disclosed in detail in JP 11-321389A, JP 2006-168629A, and JP 2012-192776A. Accordingly, further explanation will be omitted herein.

The vehicle 100 includes a notification device 16, such as a speaker, a display, or a warning lamp. The notification device 16 is communicably connected to the control unit 10.

(Brake Unit)

Figure 3:
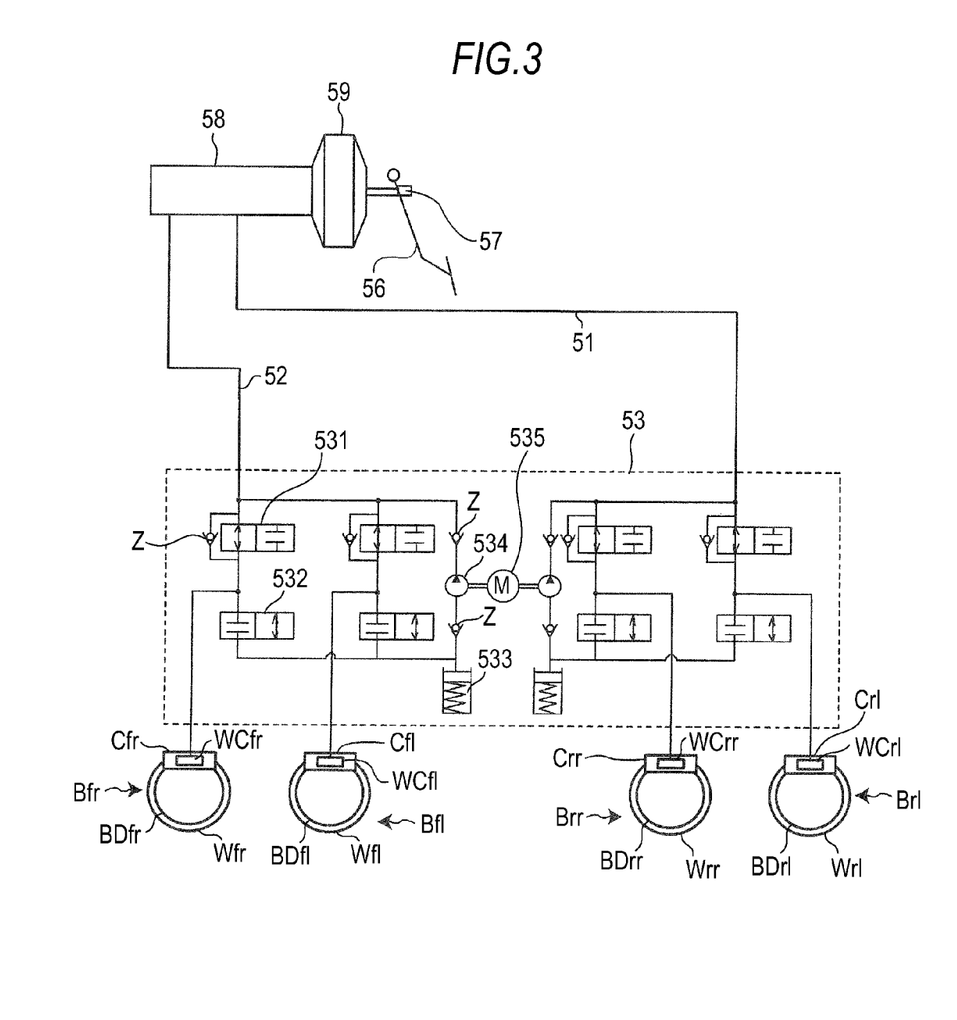
FIG. 3 is an explanatory diagram showing a brake unit, a master cylinder, a vacuum booster, and a pressure regulator.

As shown in FIG. 1 or FIG. 3, the vehicle includes brake units Bfl, Bfr, Brl, Brr, a brake pedal 56, a master cylinder 58, a vacuum booster 59, and a pressure regulator 53.

As shown in FIG. 3, the brake units Bfl, Bfr, Brl, and Brr include brake discs BDfl, BDfr, BDrl, and BDrr, which rotate integrally with wheels Wfl, Wfr, Wrl, and Wrr, and calipers Cfl, Cfr, Crl, and Crr, which generate friction braking force by pressing brake pads (not shown) against the brake discs BDfl, BDfr, BDrl, and BDrr, respectively. Wheel cylinders WCfl, WCfr, WCrl, and WCrr that press brake pads against brake discs DRfl, DRfr, DRrl, and DRrr with "master pressure" generated by the master cylinder 58 are provided in the brake units Bfl, Bfr, Brl, and Brr, respectively.

The master cylinder 58 is a device that generates "master pressure" by the operation force input to the brake pedal 56. The vacuum booster 59 is a device that is connected to an intake manifold of the engine 2 and that increases the operation force input to the brake pedal 56 with negative pressure supplied from the intake manifold and outputs the increased operation force to the master cylinder 58.

The pressure regulator 53 increases or decreases the "master pressure" of the brake fluid supplied from the master cylinder 58 and supplies "wheel cylinder pressure" to the wheel cylinders WCfl, WCfr, WCrl, and WCrr, thereby realizing well-known anti-lock brake control or antiskid control. The master cylinder 58 and the wheel cylinders WCrr and WCrl communicate with each other through a pipe 51 and the pressure regulator 53. The master cylinder 58 and the wheel cylinders WCfr and WCfl communicate with each other through a pipe 52 and the pressure regulator 53.

Here, a configuration of the pressure regulator 53 to supply the "wheel cylinder pressure" to one (WCfr) of the four wheel cylinders will be described. Since the same is true for other configurations, explanation thereof will be omitted. The pressure regulator 53 includes a holding valve 531, a decompression valve 532, a reservoir 533, a pump 534, and a motor 535. The holding valve 531 is a normally open type electromagnetic valve, and the opening and closing are controlled by the control unit 10. The holding valve 531 is provided such that one side is connected to a pipe 52 and the other side is connected to the wheel cylinder WCfr and the decompression valve 532. That is, the holding valve 531 is an input valve of the pressure regulator 53.

The decompression valve 532 is a normally closed type electromagnetic valve, and the opening and closing are controlled by the control unit 10. The decompression valve 532 is provided such that one side is connected to the wheel cylinder WCfr and the holding valve 531 and the other side is connected to the reservoir 533. When the decompression valve 532 is opened, the wheel cylinder WCfr and the reservoir 533 communicate with each other.

The reservoir 533 stores a brake fluid, and is connected to the pipe 52 through the decompression valve 532 and the pump 534. The pump 534 is provided such that a suction port is connected to the reservoir 533 and a discharge port is connected to the pipe 52 through a check valve z. The check valve z allows a flow from the pump 534 to the pipe 52, and regulates a flow in the opposite direction.

The pump 534 is driven by the operation of the motor 535 according to the command of the control unit 10. In a decompression mode of anti-lock brake control, the pump 534 absorbs a brake fluid in the wheel cylinder WCfr or a brake fluid stored in the reservoir 533 and returns the brake fluid to the master cylinder 58.

Thus, the pressure regulator 53 adjusts the "wheel cylinder pressure" regardless of the operation of the brake pedal 56, thereby being able to reduce the braking force of the brake units Bfl, Bfr, Brl, and Brr and generate the braking force in the brake units Bfl, Bfr, Brl, and Brr. The control unit 10 performs switching control of the opening and closing of the electromagnetic valves 531 and 532 based on the "master pressure", the wheel speed, and the longitudinal acceleration, and adjusts the "wheel cylinder pressure" given to the wheel cylinder WCfr by operating the motor 535 as necessary, thereby performing anti-lock brake control or antiskid control.

(Clutch Operating Device)

Figure 4:
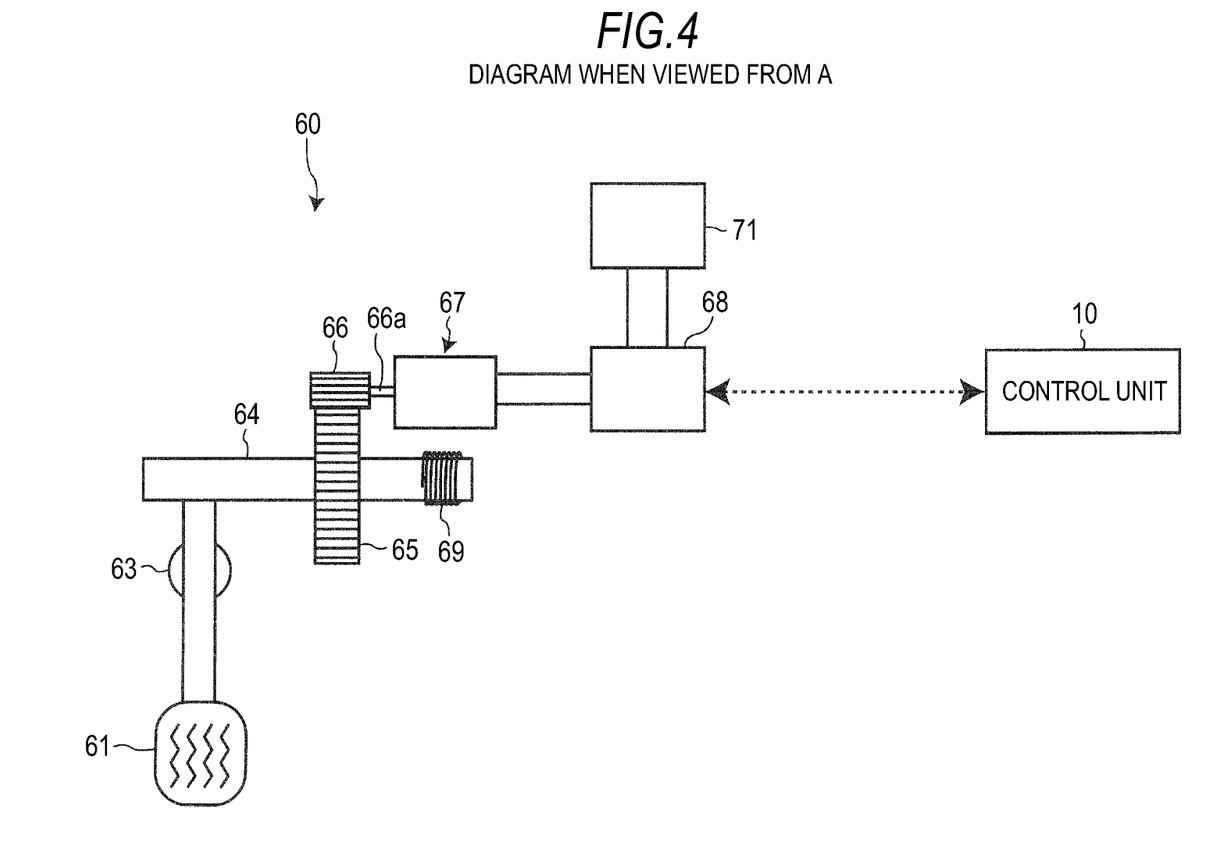
FIG. 4 is a diagram when viewed from A in FIG. 1, and is an explanatory diagram of a clutch operating device.

Hereinafter, a clutch operating device 60 will be described with reference to FIG. 4. The clutch operating device 60 is for operating the clutch 3. As shown in FIG. 4, the clutch operating device 60 includes the clutch pedal 61, the clutch sensor 62 (shown in FIG. 1), the master cylinder 63, a shaft 64, a driven gear 65, a drive gear 66, a motor 67, a clutch driver 68, a turnover spring 69, and a power storage unit 71.

The shaft 64 is rotatably fixed to the vehicle 100. The clutch pedal 61 is fixed to the shaft 64. By such a structure, the clutch pedal 61 is rotatably fixed to the vehicle 100. The driven gear 65 is fixed to the shaft 64. The drive gear 66 engages with the driven gear 65. In addition, the number of teeth of the driven gear 65 is larger than that of the drive gear 66, and the diameter of the driven gear 65 is larger than the diameter of the drive gear 66.

The motor 67 applies torque in the rotation direction of the clutch pedal 61 to the clutch pedal 61. The rotation direction includes both a direction, in which the clutch pedal 61 returns to the original position, and the opposite direction. The motor 67 includes both a DC motor and an AC motor.

The turnover spring 69 is biased in an opposite direction to a direction in which the clutch pedal 61 is stepped on, so that the clutch pedal 61 is returned to the original position before the clutch pedal 61 is stepped on. In the embodiment shown in FIG. 4, the turnover spring 69 is a wound spring which is wound around the shaft 64 and of which one end is fixed to the shaft 64 and the other end is fixed to the vehicle 100. There is no problem even if the turnover spring 69 is a coil spring.

The power storage unit 71 stores electrical power, and includes both a battery and a capacitor. There is no problem even if the power storage unit 71 is a battery that is originally installed in the vehicle 100. The clutch driver 68 is electrically connected to the motor 67 and the power storage unit 71. The clutch driver 68 is communicably connected to the control unit 10. The clutch driver 68 drives the motor 67 by converting the current supplied from the power storage unit 71 into the driving current supplied to the motor 67 based on the command from the control unit 10.

By the driving of the motor 67, the clutch stroke Cl can be arbitrarily controlled by swinging the clutch pedal 61 regardless of the operation of the clutch pedal 61 by the driver. Accordingly, it is possible to arbitrarily control the clutch torque Tc. A "clutch torque changing unit" to change the clutch torque Tc is formed by the driven gear 65, the drive gear 66, the motor 67, the clutch driver 68, and the power storage unit 71.

(Collision Avoidance Process)

Hereinafter, a "collision avoidance process" will be described with reference to the flowchart shown in FIG. 5. When the ignition is ON so that the vehicle 100 can travel, the "collision avoidance process" starts, and the program proceeds to S11.

When the control unit 10 determines that there is a possibility of collision in step S11 (S11: YES), the program proceeds to step S21. When it is determined that there is no possibility of collision in step S11 (S11: NO), the process of step S11 is repeated.

In step S21, the control unit 10 calculates a collision avoidance deceleration as. Specifically, the collision avoidance deceleration as is calculated based on the following Expression (1).

$$\alpha s = (-0.5 \cdot ((Vfwd/3.6)^2 - (Vown/3.6)^2)/(d1 - Lr + (Vown/3.6) \cdot tb))/g \qquad (1)$$

αs: collision avoidance deceleration
Vfwd: obstacle speed
Vown: host vehicle speed
d1: distance to an obstacle in front that is a target at the time of stop (setting value)
Lr: distance to an obstacle in front
tb: idle time (setting value)
g: gravitational acceleration The control unit 10 calculates the obstacle speed Vfwd or the distance Lr to an obstacle in front based on the detection information from the obstacle detection device 15. The idle time tb is a time until steps S33 and S43 that are control for avoiding collision, which will be described later, start from the current point in time. Since the method of calculating the collision avoidance deceleration αs is disclosed in JP 11-321389A, further explanation thereof will be omitted. After step S21 ends, the program proceeds to step S31.

When the control unit 10 determines that the clutch 3 is not completely engaged based on the detection signal from the clutch sensor 62 in step S31 (S31: YES), the program proceeds to step S32. When the control unit 10 determines that the clutch 3 is completely engaged based on the detection signal from the clutch sensor 62 in step S31 (S31: NO), the program proceeds to step S33. The state where the clutch 3 is not completely engaged is a state where the clutch torque Tc is not the maximum value, and refers to a state where the clutch 3 is a half-clutch state or a state where the clutch 3 is disengaged. This state where the clutch 3 is not completely engaged occurs when the driver steps on the clutch pedal 61.

In step S32, the control unit 10 outputs a control signal to the clutch driver 68 to drive the motor 67, thereby maximizing the clutch torque Tc so that the clutch 3 is completely engaged. After step S32 ends, the program proceeds to step S33.

In step S33, the control unit 10 generates a so-called engine brake in the engine 2 by closing the throttle valve 22 and stopping the fuel injection in the fuel injection device 28 (fuel cut). After step S33 ends, the program proceeds to step S41.

When the control unit 10 determines that collision can be avoided by generating the engine brake in step S41 (S41: YES), the program proceeds to step S43. When the control unit 10 determines that collision cannot be avoided by generating the engine brake in step S41 (S41: NO), the program proceeds to step S42. In addition, when the vehicle 100 does not reach the collision avoidance deceleration as even if the engine brake occurs, it is determined that collision cannot be avoided.

In step S42, the control unit 10 generates a braking force in the brake units Bfl, Bfr, Brl, and Brr so that the vehicle 100 reaches the collision avoidance deceleration as by outputting a control signal to the pressure regulator 53 (shown in FIG. 3). After step S42 ends, the program proceeds to step S43.

In step S43, the notification device 16 sends a notification, which indicates intervention for collision avoidance control (steps S32, S33, and S42), based on the command from the control unit 10. After step S43 ends, the program proceeds to step S51.

When the control unit 10 determines that the vehicle 100 has stopped and the engine 2 has stopped (engine stall) based on the detection signals from the output shaft rotation speed sensor 46 and the engine rotation speed sensor 23 in step S51 (S51: YES), the program proceeds to step S61. When the control unit 10 determines that the vehicle 100 is not stopped or the engine 2 is not stopped in step S51 (S51: NO), the program proceeds to step S52.

When the control unit 10 determines that there is no possibility of collision based on the information from the obstacle detection device 15 in step S52 (S52: YES), the program proceeds to step S53. When the control unit 10 determines that there is a possibility of collision in step S52 (S52: NO), the program returns to step S21.

In step S53, the control unit 10 stops the process under execution among the processes of steps S32, S33, and S42. After step S53 ends, the program returns to step S11.

In step S61, the control unit 10 outputs a control signal to the clutch driver 68 to drive the motor 67, thereby minimizing the clutch torque Tc so that the clutch 3 is completely disengaged. After step S61 ends, the program proceeds to step S62.

In step S62, the control unit 10 outputs a control signal to the fuel injection device 28, the throttle valve 22, and the ignition device (in the case of a gasoline engine) to start the engine 2. After step S62 ends, the program proceeds to step S63.

In step S63, the notification device 16 sends a notification, which indicates that the engine 2 has been restarted after the clutch 3 is disengaged, based on the command from the control unit 10. After step S63 ends, the program proceeds to step S71.

When the control unit 10 determines that there is no possibility of collision and there is an operation on the accelerator pedal 81 by the driver based on the information from the obstacle detection device 15 and the signal from the accelerator sensor 82 in step S71 (S71: YES), the program proceeds to step S73. When the control unit 10 determines that there is a possibility of collision or determines that there is no operation on the accelerator pedal 81 by the driver based on the information from the obstacle detection device 15 and the signal from the accelerator sensor 82 in step S71 (S71: NO), the program proceeds to step S72.

When the control unit 10 determines that the manual transmission 47 is in a neutral state based on the detection signal from the neutral detection sensor 48 in step S72 (S72: YES), the program proceeds to step S73. When the control unit 10 determines that the manual transmission 47 is not in a neutral state based on the detection signal from the neutral detection sensor 48 in step S72 (S72: NO), the program returns to step S63.

In step S73, the control unit 10 outputs a control signal to the clutch driver 68 to drive the motor 67, thereby maximizing the clutch torque Tc so that the clutch 3 is completely engaged. After step S73 ends, the program returns to step S11.

(Collision Avoidance Process When a Vehicle Travels)

Hereinafter, a collision avoidance process when the vehicle 100 travels will be described with reference to the time chart shown in FIG. 6. When the relative distance between the vehicle 100 and the obstacle, such as a vehicle in front, is reduced ((1) in FIG. 6) and it is determined that there is a possibility of collision (determined to be YES in step S11 in FIG. 5) (T1 in FIG. 6), a fuel cut is performed in the engine 2 regardless of the operation of the accelerator pedal 81 by the driver, so that the engine brake occurs ((2) in FIG. 6). Then, the vehicle 100 is decelerated ((3) in FIG. 6).

Figure 5:
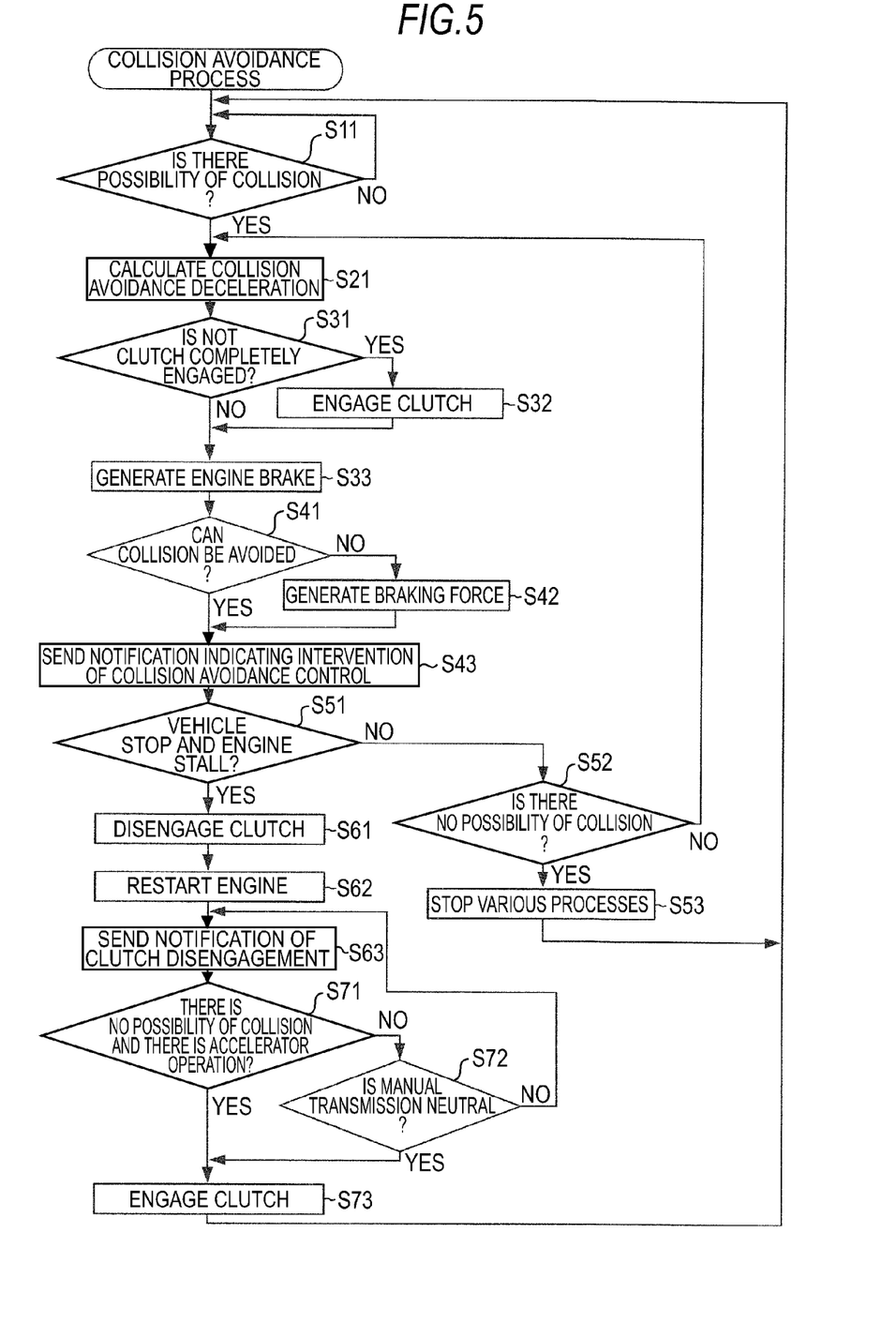
FIG. 5 is a flowchart of the "collision avoidance process"
Figure 6:
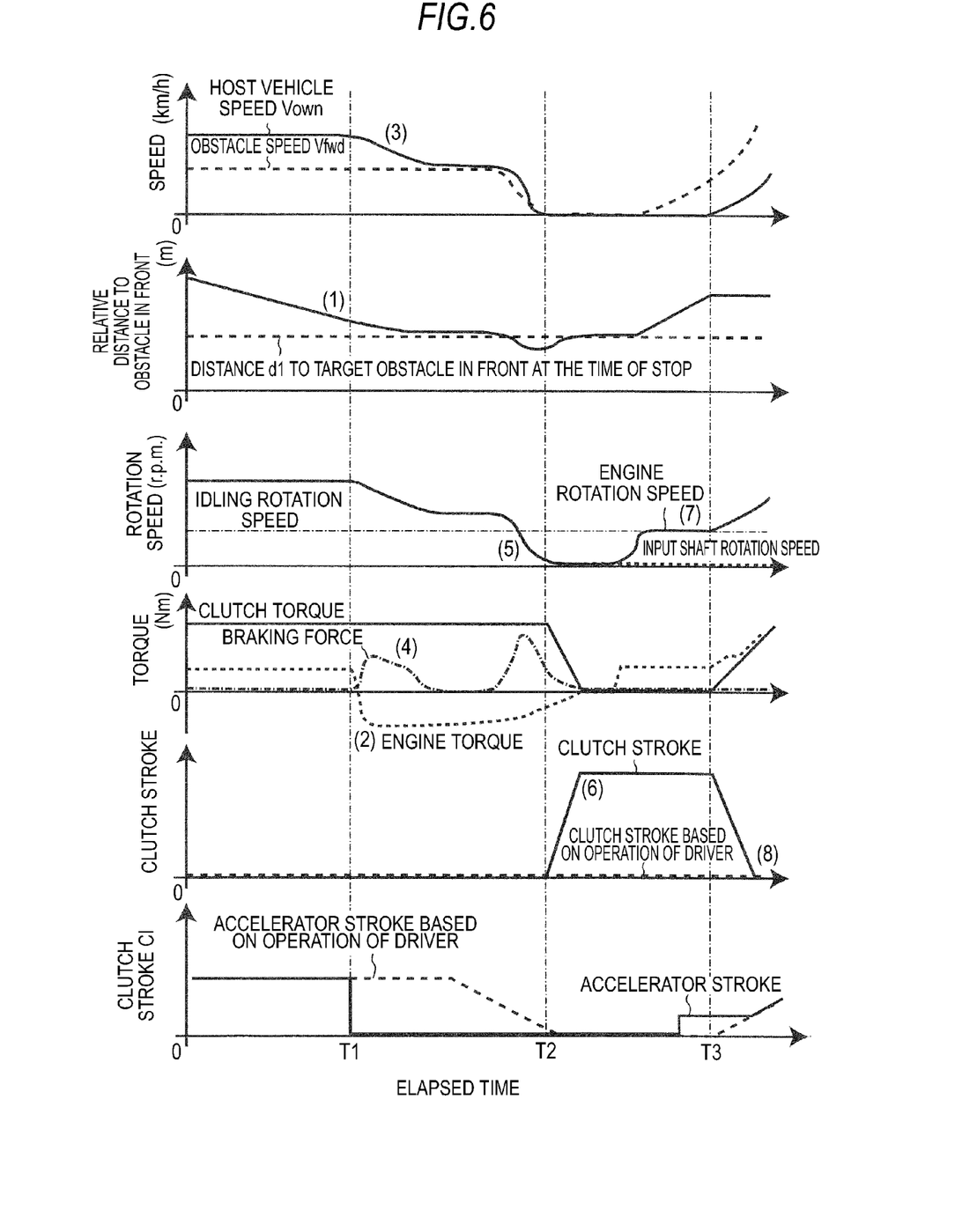
FIG. 6 is a time chart showing the relationship between the elapsed time and speed, relative distance to an obstacle in front, rotation speed, torque, and a clutch stroke at the time of traveling of a vehicle.

When collision cannot be avoided just by generating the engine brake (when NO is determined in step S41 in FIG. 5), a braking force is generated ((4) in FIG. 6). Even if the engine rotation speed Ne is less than the idling rotation speed of the engine 2 ((5) in FIG. 6), stopping the fuel cut is not executed, and the fuel cut is maintained in the engine 2. For this reason, the vehicle 100 is decelerated by the engine brake.

When the vehicle 100 stops and the engine 2 stops (when YES is determined in step S51 in FIG. 5, T2 in FIG. 6), the clutch 3 is engaged regardless of the operation of the clutch pedal 61 by the driver ((6) in FIG. 6). Then, the engine 2 is restarted ((7) in FIG. 6). When there is no possibility of collision and there is an accelerator operation by the driver (when YES is determined in step S71 in FIG. 5, T3 in FIG. 6), the clutch 3 is engaged regardless of the operation of the clutch pedal 61 by the driver ((8) in FIG. 6).

(Effect of the Present Embodiment)

As is apparent from the above explanation, when there is a possibility that the vehicle 100 will collide with an obstacle (when YES is determined in step S11 in FIG. 5), the control unit 10 performs a fuel cut in the engine 2 in a state where the clutch 3 is engaged (step S33 in FIG. 5). In this case, an engine brake occurs to decelerate the vehicle 100. As a result, it is possible to avoid collision between the vehicle 100 and the obstacle in front. In addition, even if the engine rotation speed Ne is less than the idling rotation speed ((5) in FIG. 6), the control unit 10 stops the stopping of the fuel cut to perform the fuel cut. By the stopping of the fuel cut, the loss of the engine brake is prevented. For this reason, since the vehicle 100 can be decelerated and stopped by the engine brake, it is possible to avoid collision between the vehicle 100 and the obstacle in front.

When the engine 2 has stopped due to the continuation of the fuel cut (when YES is determined in step S51 in FIG. 5), the control unit 10 (engine restart unit) restarts the engine 2 after disengaging the clutch 3 (S62 in FIG. 5). As a result, driver's work for the operation to restart the engine 2 is eliminated.

After the engine 2 is restarted, when the operation of the engine operation unit by the driver is detected and it is determined that there is no possibility of collision with the obstacle (determined to be YES in step S71), the control unit 10 (first clutch returning unit) stops the intervention in the clutch 3 by the motor 67 (clutch torque changing unit), thereby engaging the clutch 3 (step S73 in FIG. 5). As a result, a possibility of collision between the vehicle 100 and the obstacle is eliminated, and the vehicle starts when the driver intends to start the vehicle 100 by operating the accelerator pedal 81. For this reason, a special operation for start by the driver is not required.

After the engine 2 is restarted, when the manual transmission 4 is in a neutral state (when YES is determined in step S72 in FIG. 5), the control unit 10 (second clutch returning unit) stops the intervention in the clutch 3 by the motor 67 (clutch torque changing unit), thereby engaging the clutch 3 (step S73 in FIG. 5). In this case, since the manual transmission 4 is in a neutral state, the intervention in the clutch 3 by the motor 67 is automatically stopped when the vehicle 100 does not start even if the clutch 3 is engaged. For this reason, even if the driver does not perform a special operation other than setting the manual transmission 4 to the neutral state, the intervention in the clutch 3 by the motor 67 is stopped. Therefore, a special operation for engaging the clutch 3 by the driver is not required.

In step S43 in FIG. 5, the notification device 16 (first notification unit) notifies the driver of intervention for collision avoidance by the control unit 10, that is, the occurrence of engine brake or the generation of braking force. In this manner, by notifying the driver of the intervention for collision avoidance, the driver can perceive that there is a possibility of collision. As a result, it is possible to call the attention of the driver. Since the driver perceives the intervention for collision avoidance, it is possible to reduce the discomfort of the driver due to a change in the behavior of the vehicle 100 according to the intervention for collision avoidance.

In step S63 in FIG. 5, the notification device 16 (second notification unit) notifies the driver of the restart of the engine 2, that is, notifies the driver that the clutch 3 has been disengaged and the engine 2 has been restarted. Accordingly, the driver can perceive that the clutch 3 is disengaged regardless of the operation of the clutch pedal 61. For this reason, the occurrence of the driver's discomfort due to a gap between the operation of the clutch pedal 61 and the state of the clutch 3 is prevented.

When the operation of the clutch pedal 61 by the driver is detected (when YES is determined in step S31 in FIG. 5), the control unit 10 engages the clutch 3 using the motor 67 (step S32 in FIG. 5). In this case, it is possible to make an engine brake act on the vehicle 100 reliably.

When there is a possibility of collision between the vehicle 100 and an obstacle (when YES is determined in steps S11 and S41 in FIG. 5), the control unit 10 generates a braking force in the brake units Bfl, Bfr, Brl, and Brr (step S42 in FIG. 5). Thus, it is possible to decelerate or stop the vehicle 100 reliably by the generation of braking force.

(Other Embodiments)

Hereinafter, different embodiments from the above embodiment will be described.

In the embodiment described above, a rotary shaft 67a of the motor 67 is rotatably connected to the shaft 64 through the drive gear 66 and the driven gear 65. However, the rotary shaft 67a of the motor 67 may be directly connected to the shaft 64. In the present embodiment, since torque output from the motor 67 is increased and transmitted to the shaft 64 by the drive gear 66 and the driven gear 65, it is possible to use a small motor 67. Alternatively, the torque output from the motor 67 may be directly applied to the clutch pedal 61.

In the embodiment described above, since the motor 67 rotates the clutch pedal 61, the clutch torque Tc is variably controlled. However, the mechanism (clutch torque changing unit) that controls the clutch torque Tc by rotation is not limited to this. For example, a hydraulic circuit for increasing or decreasing the hydraulic pressure generated by the master cylinder 63 or a mechanism for making the clutch disc 32 close to or away from the flywheel 31 or the pressure plate 35 with an actuator may be used.

In the embodiment described above, the operation force of the clutch pedal 61 is transmitted to the release bearing 37 through the master cylinder 63, the hydraulic pressure pipe 39, and the slave cylinder 38. However, the operation force of the clutch pedal 61 may be transmitted to the release bearing 37 through a mechanical element, such as a wire, a rod, or a gear.

In the embodiment described above, the clutch sensor 62 detects a stroke amount of the master cylinder 63. However, the clutch sensor 62 may be a sensor that detects the operation amount of the clutch pedal 61, the master pressure of the master cylinder 63, the stroke or hydraulic pressure of the slave cylinder 38, or the stroke amount of the release bearing 37.

In the embodiment described above, the control unit 10 calculates the host vehicle speed Vown based on the output shaft rotation speed No detected by the output shaft rotation speed sensor 46 (speed detection unit). However, the control unit 10 may calculate the host vehicle speed Vown based on the wheel rotation speed detected by a wheel speed sensor (speed detection unit), which detects the rotation speed of the wheel, or a sensor (speed detection unit) that detects the rotation speed of the shaft rotating in conjunction with other wheels.

In the embodiment described above, the clutch pedal 61 is a clutch operation member for transmitting the operation force of the driver to the clutch 3. However, the clutch operation member is not limited to the clutch pedal 61. For example, a clutch lever may be used. Similarly, instead of the accelerator pedal 81 for adjusting the accelerator opening Ac, it is possible to use an accelerator grip for adjusting the accelerator opening Ac, for example. In addition, it is needless to say that the technical idea disclosed here can be applied even if the vehicle driving device of the present embodiment is applied to motorcycles or other vehicles.

In the embodiment described above, the single control unit 10 performs the "collision avoidance process" shown in FIG. 5 while controlling the engine 2. However, an engine control unit may control the engine 2, and the control unit 10 that is connected to the engine control unit through communication means, such as a controller area network (CAN), may perform the "collision avoidance process".

A first aspect of this disclosure is directed to a vehicle driving device including: a clutch that is provided between a driving shaft of an engine and an input shaft of a manual transmission and that connects the driving shaft and the input shaft to each other or disconnects the driving shaft and the input shaft from each other; a detection unit that detects an obstacle that is an obstacle to traveling of a host vehicle; a collision possibility determination unit that determines a possibility of collision between the obstacle and the host vehicle based on obstacle detection information detected by the detection unit; and a collision avoidance unit that, when the collision possibility determination unit determines that there is a possibility of collision with the obstacle, performs a fuel cut of the engine even if a rotation speed of the engine is less than an idling rotation speed.

A second aspect of this disclosure is directed to the vehicle driving device according to the first aspect of this disclosure, wherein the collision avoidance unit performs the fuel cut in the engine in a state where the clutch is engaged.

A third aspect of this disclosure is directed to the vehicle driving device according to the first or second aspect of this disclosure, which further includes: a speed detection unit that detects a speed of the vehicle; a clutch torque changing unit that changes clutch torque between the driving shaft and the input shaft; and an engine restart unit that restarts the engine after disengaging the clutch by the clutch torque changing unit when the engine is stopped by the fuel cut.

A fourth aspect of this disclosure is directed to the vehicle driving device according to the third aspect of this disclosure, which further includes: an engine operation unit that operates an output of the engine based on an operating force; an engine operation amount detection unit that detects an operation amount of the engine operation unit; and a first clutch returning unit that stops intervention of the clutch torque changing unit when the engine operation amount detection unit detects an operation of the engine operation unit and the collision possibility determination unit determines that there is no possibility of collision with the obstacle after the engine is restarted.

A fifth aspect of this disclosure is directed to the vehicle driving device according to the third or fourth aspect of this disclosure, which further includes a second clutch returning unit that stops intervention of the clutch torque changing unit when the manual transmission is in a neutral state after the engine is restarted.

A sixth aspect of this disclosure is directed to the vehicle driving device according to any one of the first to fifth aspects of this disclosure, which further includes: the clutch torque changing unit that changes clutch torque between the driving shaft and the input shaft; and a clutch operation detection unit that detects an operation of a clutch operation unit that operates the clutch. The collision avoidance unit may engage the clutch using the clutch torque changing unit when the clutch operation detection unit detects the operation of the clutch operation unit.

A seventh aspect of this disclosure is directed to the vehicle driving device according to any one of the first to sixth aspects of this disclosure, which further includes a braking force generation unit that generates a braking force. The collision avoidance unit may cause the braking force generation unit to generate a braking force when the collision possibility determination unit determines that there is a possibility of collision with the obstacle.

According to the first aspect of this disclosure, even if the rotation speed of the engine is less than the idling rotation speed, the collision avoidance unit performs the fuel cut of the engine. By the stopping of the fuel cut, the loss of the engine brake is prevented. For this reason, since the vehicle can be decelerated and stopped by the engine brake, it is possible to avoid collision between the vehicle and the obstacle in front.

According to the second aspect of this disclosure, when there is a possibility of collision with the obstacle, the collision avoidance unit performs the fuel cut in the engine in a state where the clutch is engaged. In this case, an engine brake occurs to decelerate the vehicle. As a result, it is possible to avoid collision between the vehicle and the obstacle in front.

According to the third aspect of this disclosure, when the engine is stopped by continuation of the fuel cut, the engine restart unit restarts the engine after disengaging the clutch. As a result, driver's work for the operation to restart the engine is eliminated.

According to the fourth aspect of this disclosure, after the engine is restarted, the first clutch returning unit stops the intervention of the clutch torque changing unit when the operation of the engine operation unit by the driver is detected and it is determined that there is no possibility of collision with the obstacle. As a result, a possibility of collision between the vehicle and the obstacle is eliminated, and the vehicle starts when the driver intends to start the vehicle by operating the engine operation unit. For this reason, a special operation for start by the driver is not required.

According to the fifth aspect of this disclosure, after the engine is restarted, the second clutch returning unit stops the intervention of the clutch torque changing unit when the manual transmission is in a neutral state. In this case, since the manual transmission is in a neutral state, the intervention of the clutch torque changing unit is automatically stopped when the vehicle does not start even if the clutch is engaged. For this reason, even if the driver does not perform a special operation other than setting the manual transmission to the neutral state, the intervention of the clutch torque changing unit is stopped. Therefore, a special operation for engaging the clutch by the driver is not required.

According to the sixth aspect of this disclosure, the collision avoidance unit may engage the clutch using the clutch torque changing unit when the operation of the clutch operation unit is detected. In this case, it is possible to make an engine brake act on the vehicle reliably.

According to the seventh aspect of this disclosure, the collision avoidance unit causes the braking force generation unit to generate a braking force when there is a possibility that the vehicle will collide with the obstacle. Thus, it is possible to decelerate or stop the vehicle reliably by the generation of braking force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle driving device comprising:
    a clutch that is provided between a driving shaft of an engine and an input shaft of a manual transmission and that connects the driving shaft and the input shaft to each other or disconnects the driving shaft and the input shaft from each other;
    a detection unit that detects an obstacle that is an obstacle to traveling of a host vehicle;
    a collision possibility determination unit that determines a possibility of collision between the obstacle and the host vehicle based on obstacle detection information detected by the detection unit;
    a collision avoidance unit that, when the collision possibility determination unit determines that there is a possibility of collision with the obstacle, performs a fuel cut of the engine even if a rotation speed of the engine is less than an idling rotation speed;
    a speed detection unit that detects a speed of the vehicle;
    a clutch torque changing unit that changes clutch torque between the driving shaft and the input shaft; and
    an engine restart unit that restarts the engine after disengaging the clutch by the clutch torque changing unit when the engine is stopped by the fuel cut.

2. The vehicle driving device according to claim 1, wherein the collision avoidance unit performs the fuel cut in the engine in a state where the clutch is engaged.

3. The vehicle driving device according to claim 1, further comprising:
    an engine operation unit that operates an output of the engine based on an operating force;

an engine operation amount detection unit that detects an operation amount of the engine operation unit; and a first clutch returning unit that stops intervention of the clutch torque changing unit when the engine operation amount detection unit detects an operation of the engine operation unit and the collision possibility determination unit determines that there is no possibility of collision with the obstacle after the engine is restarted.

4. The vehicle driving device according to claim 1, further comprising:

a second clutch returning unit that stops intervention of the clutch torque changing unit when the manual transmission is in a neutral state after the engine is restarted.

5. The vehicle driving device according to claim 1, further comprising:

a clutch torque changing unit that changes clutch torque between the driving shaft and the input shaft; and a clutch operation detection unit that detects an operation of a clutch operation unit that operates the clutch, wherein the collision avoidance unit engages the clutch using the clutch torque changing unit when the clutch operation detection unit detects the operation of the clutch operation unit.

6. The vehicle driving device according to claim 1, further comprising:

a braking force generation unit that generates a braking force, wherein the collision avoidance unit causes the braking force generation unit to generate a braking force when the collision possibility determination unit determines that there is a possibility of collision with the obstacle.

* * * * *